United States Patent
Duluk, Jr.

(10) Patent No.: US 7,697,007 B1
(45) Date of Patent: Apr. 13, 2010

(54) PREDICATED LAUNCHING OF COMPUTE THREAD ARRAYS

(75) Inventor: Jerome F. Duluk, Jr., Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 341 days.

(21) Appl. No.: 11/457,084

(22) Filed: Jul. 12, 2006

Related U.S. Application Data

(63) Continuation-in-part of application No. 11/312,002, filed on Dec. 19, 2005.

(51) Int. Cl.
- G06T 1/00 (2006.01)
- G06T 15/00 (2006.01)
- G06F 15/16 (2006.01)
- G06F 9/00 (2006.01)
- G06F 9/30 (2006.01)
- G06F 9/46 (2006.01)

(52) U.S. Cl. .................. 345/522; 345/502; 345/505; 345/506; 712/215; 712/234; 712/235; 718/107

(58) Field of Classification Search ............... 345/522, 345/502–506; 718/104–108; 712/234–235; 712/215
See application file for complete search history.

(56) References Cited

U.S. PATENT DOCUMENTS

| | | | |
|---|---|---|---|
| 2002/0152280 A1* | 10/2002 | Winkeler et al. | 709/217 |
| 2002/0174318 A1 | 11/2002 | Stuttard et al. | |
| 2003/0140179 A1* | 7/2003 | Wilt et al. | 709/321 |
| 2004/0163083 A1* | 8/2004 | Wang et al. | 718/102 |
| 2007/0288730 A1* | 12/2007 | Luick | 712/235 |

OTHER PUBLICATIONS

S.J. Eggers et al., "Simultaneous Multithreading: A Platform for Next-Generation Processors" IEEE Micro, Sep.-Oct. 1997, p. 12-19.

* cited by examiner

*Primary Examiner*—Xiao M Wu
*Assistant Examiner*—Tize Ma
(74) *Attorney, Agent, or Firm*—Townsend and Townsend and Crew LLP

(57) ABSTRACT

A controlling process may enable or disable the launching of a predicated process that has already been queued for launching, e.g. via a pushbuffer. The controlling process generates a report so that launching of the predicated process is enabled or disabled based on the report. The predicate may be global in application to enable or disable all subsequent launch commands. Alternatively, the predicate may be specific to one or more predicated processes. In an embodiment with a central processing unit (CPU) coupled to a graphics processing unit (GPU), the CPU may generate the controlling process that enables or disables the launch of the predicated process. Alternatively or additionally, the GPU may generate the controlling process that enables or disables the launch of the predicated process.

18 Claims, 4 Drawing Sheets

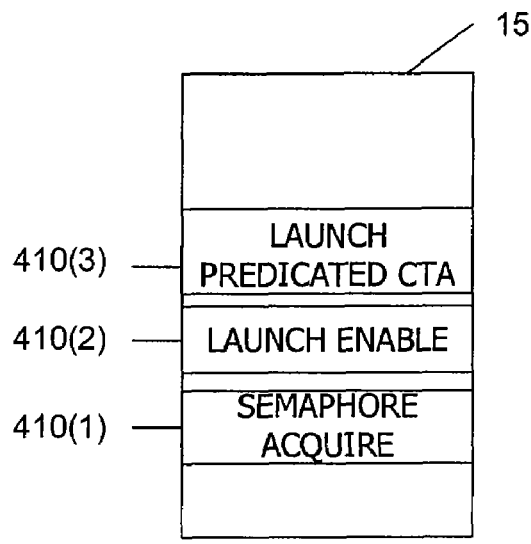
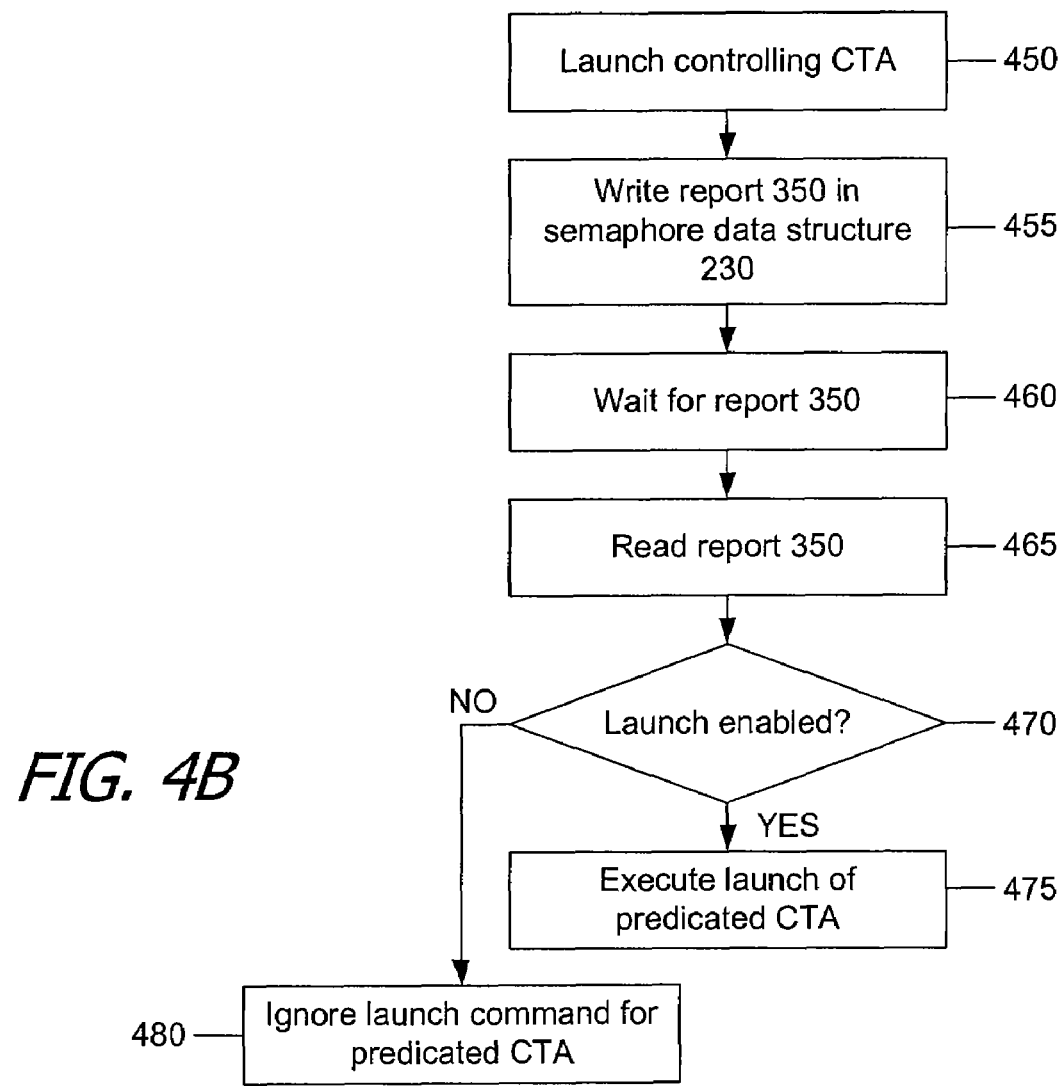
FIG. 4A
FIG. 4B

PREDICATED LAUNCHING OF COMPUTE THREAD ARRAYS

CROSS-REFERENCES TO RELATED APPLICATIONS

The present application is a continuation-in-part and claims priority to commonly-assigned co-pending U.S. patent application Ser. No. 11/312,002, filed Dec. 19, 2005, entitled "Pushbuffer Launching of Processor Threads," the disclosure of which is incorporated for all purposes as if set forth fully herein.

BACKGROUND OF THE INVENTION

The present invention relates in general to data processing, and in particular to predicated launching of threads in a processor.

In computer programming, a predicate is generally defined as an operator or function which returns a Boolean value, true or false. Predication is a choice to execute (or not to execute) a given instruction based on the content of a memory location such as a machine register. Some applications can be optimized by loading launch commands for several program threads but then selectively launching the program threads depending on a predicate.

For example, in some applications it is desirable for launching of a second program thread to be predicated by a result of a first program thread. The second program thread may provide extra processing that may or may not be needed, depending on the results generated by the first program thread. Predication allows launch commands for the second program thread to be loaded, but if the extra processing is not needed, the launch commands for the second program thread may be ignored so that the second program thread does not launch.

BRIEF SUMMARY OF THE INVENTION

As described in U.S. patent application Ser. No. 11/312, 002, a pushbuffer can be used as a mechanism to queue the launching of Cooperative Thread Arrays (CTAs). With the pushbuffer mechanism, many CTAs can be queued at once. The present disclosure includes systems and methods for a controlling process to enable or disable the launching of a predicated process that has already been queued for launching, e.g. via a pushbuffer. The controlling process generates a report so that launching of the predicated process is enabled or disabled based on the report. The predicate may be global in application, so as to enable or disable all subsequent launch commands. Alternatively, the predicate may be specific to one or more predicated processes.

In an embodiment with a central processing unit (CPU) coupled to a graphics processing unit (GPU), the CPU may generate the controlling process that enables or disables the launch of the predicated process. Alternatively or additionally, the GPU may generate the controlling process that enables or disables the launch of the predicated process.

Therefore, in one aspect, a method comprises loading a first launch command for a first thread into a pushbuffer coupled to a graphics processor; loading a second launch command for a second thread into the pushbuffer; and determining in the graphics processor whether to execute the second launch command based upon a predicate generated by the first thread.

In another aspect, a system comprises a CPU, a GPU, and a memory coupled to the CPU and the GPU. The CPU is configured to generate a first launch command for a first thread and a second launch command for a second thread. The memory includes a pushbuffer configured to receive the first launch command and the second launch command from the CPU. The GPU is configured to determine whether to execute the second launch command based at least upon a predicate generated by the first thread.

In a further aspect, a system comprises a graphics processor and a memory coupled to the graphics processor. The graphics processor is configured to generate a first launch command for a first process and a second launch command for a second process. The memory includes a pushbuffer configured to receive the first launch command and the second launch command. The graphics processor is configured to determine whether to execute the second launch command based at least upon a predicate generated by the first process.

BRIEF DESCRIPTION OF THE DRAWINGS

FIG. 4A illustrates a sequence 410 of pushbuffer 150 commands that allow a controlling process to predicate the launch of subsequent processes, in an exemplary embodiment.

FIG. 4B illustrates processing of the pushbuffer command sequence 410.

DETAILED DESCRIPTION OF THE INVENTION

System Overview

FIGS. 1 through 4 illustrate exemplary parallel processing architectures and techniques for predicated launching of compute thread arrays. However, the systems and methods disclosed herein for are not limited to any particular processing architecture. For example, the architecture described herein includes a computer system with a central processing unit (CPU) and a graphics processing unit (GPU) that supports parallel processing applications. However, the methods described herein are not limited to application on a GPU and instead are applicable to virtually any processing device. Further, as described below, the architecture of the GPU includes a hierarchical arrangement for parallel processing of threads (lowest level), single-instruction multiple data (SIMD) groups of a number (e.g. 16) of threads, and cooperative thread arrays (CTAs) of a number of threads (highest level), although the techniques described herein may be applied to processing of threads in non-hierarchical or "flat" arrangement.

Figure 1:
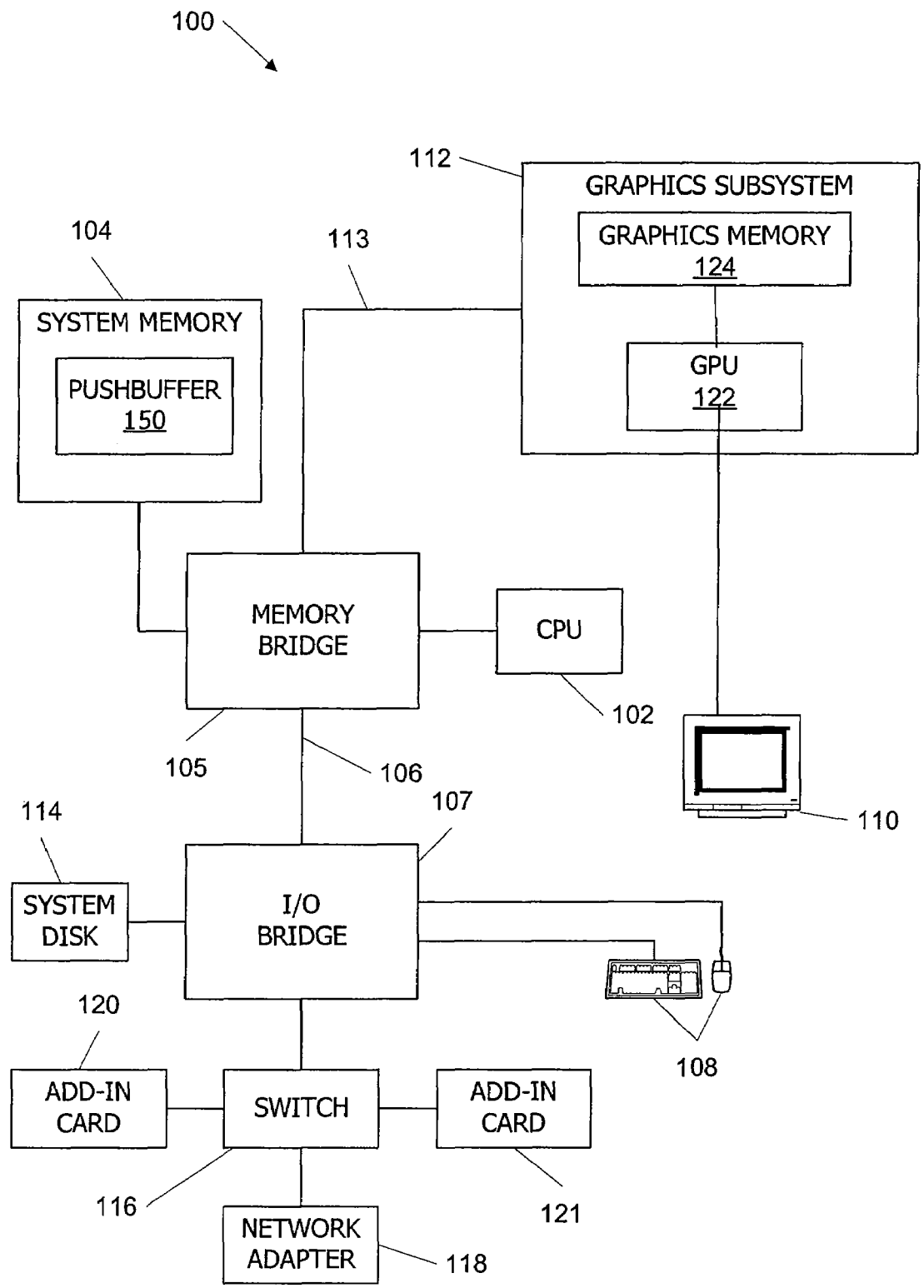
FIG. 1 is a block diagram of a computer system 100 according to an embodiment of the present invention.

FIG. 1 is a block diagram of a computer system 100 according to an embodiment of the present invention. Computer system 100 is merely exemplary, and a number of alterations may be made to computer system 100. Computer system 100 includes a central processing unit (CPU) or control processor 102 and a system memory 104 communicating via a communications path that includes a memory bridge 105. Memory bridge 105 (e.g. a Northbridge chip) is connected via a communication path 106 (e.g., a point-to-point connection using the HyperTransport protocol) to an I/O (input/output) bridge 107. I/O bridge 107 (e.g. a Southbridge chip) receives user input from one or more user input devices 108 (e.g., keyboard, mouse) and forwards the input to CPU 102 via communication path 106 and memory bridge 105. Visual output is provided on a pixel based display device 110 (e.g., a CRT or LCD based monitor) operating under control of a graphics subsystem 112 coupled to memory bridge 105 via communication path 113, which may be implemented using, e.g., PCI Express (PCI-E), Accelerated Graphics Port (AGP), or any other point-to-point or bus protocol. A system disk 114 is also connected to I/O bridge 107. A switch 116 provides connections between I/O bridge 107 and other components such as a network adapter 118 and various add-in cards 120, 121. Other components (not explicitly shown), including USB or other port connections, CD drives, DVD drives, and the like, may also be connected to I/O bridge 107. In various embodiments, connections among system components may be implemented using suitable protocols such as PCI (Peripheral Component Interconnect), PCI-E, AGP, HyperTransport, or any other point-to-point or bus protocol(s), and connections between different devices may use different protocols as is known in the art.

Graphics processing subsystem 112 includes a number N of graphics processing units (GPU) 122 and graphics memories 124, which may be implemented, e.g., using one or more integrated circuit devices such as programmable processors, application specific integrated circuits (ASICs), and memory devices. Each GPU 122 may be configured to perform various tasks related to generating pixel data from graphics data supplied by CPU 102 and/or system memory 104 via memory bridge 105 and bus 113, interacting with graphics memories 124 to store and update pixel data, and the like. For example, GPU 122 may generate pixel data from 2-D or 3-D scene data provided by various programs executing on CPU 102.

CPU 102 operates as the control processor of system 100, controlling and coordinating operations of other system components. In particular, CPU 102 issues commands that control the operation of GPU 122.

In some embodiments, CPU 102 writes a stream of commands for GPU 122 to a command buffer or "pushbuffer" 150. Although pushbuffer 150 is depicted as within system memory 104, pushbuffer 150 may alternatively reside in graphics memory 124, another storage location in system 100 that is accessible to both CPU 102 and GPU 122, or may reside in any combination of system memory 104, graphics memory 124, or other storage locations.

As described further below, pushbuffer 150 operates as a first-in, first-out FIFO buffer for thread launch commands to GPU 122. GPU 122 reads the command stream from the pushbuffer (e.g., by direct memory access or DMA) and executes commands asynchronously with respect to operation of CPU 102.

Processing Pipeline for Graphics and Compute Classes in GPU

Figure 2:
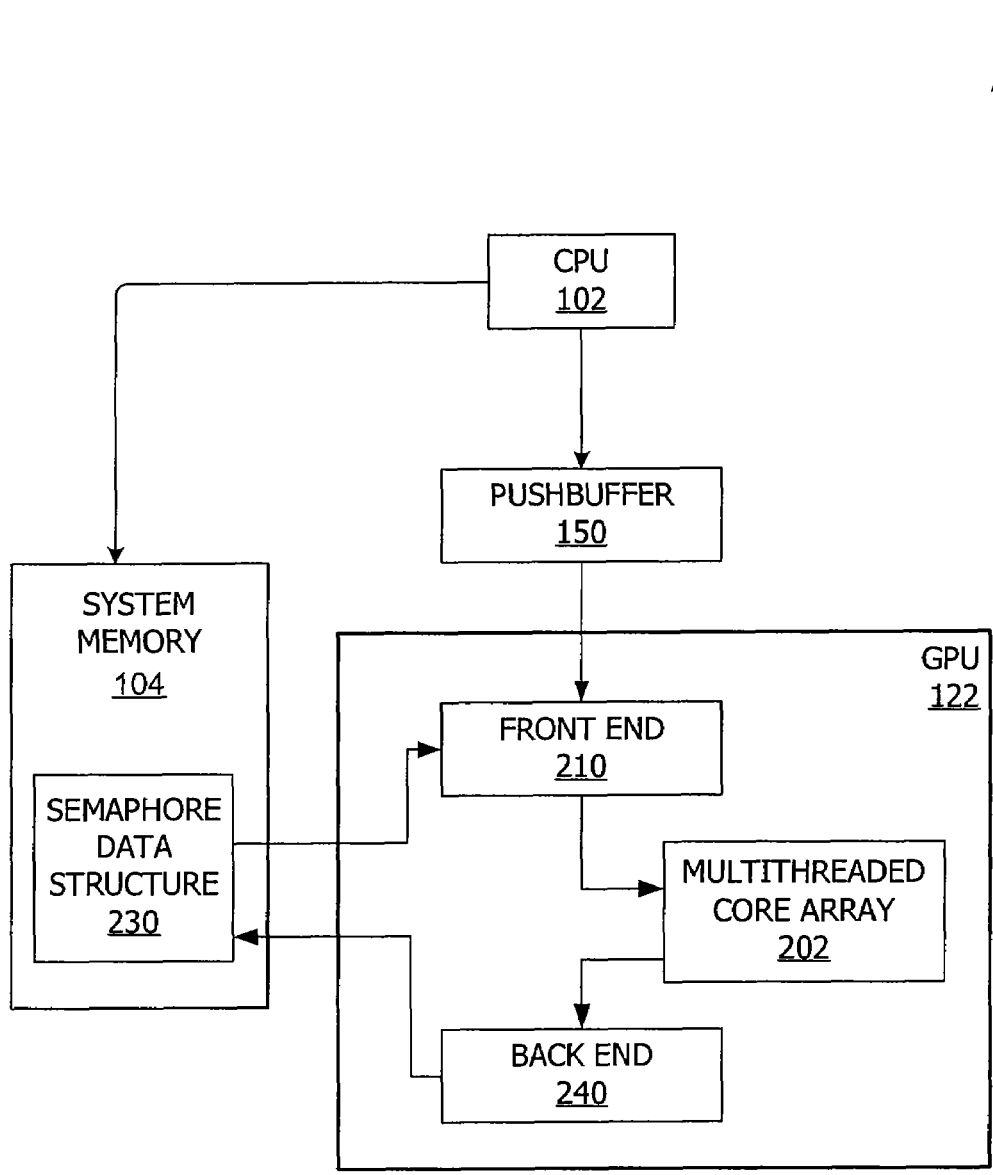
FIG. 2 is a generalized block diagram showing further detail of GPU 122 of FIG. 1 according to an embodiment of the present invention.

FIG. 2 is a generalized block diagram showing further detail of GPU 122 of FIG. 1 according to an embodiment of the present invention. As described further below, GPU 122 is configured to execute programs or threads of programs in a "compute class," a "graphics class," and/or other classes of programs and/or other classes of command interfaces.

Programs in the compute class allow GPU 122 to provide general-purpose computations (e.g., streaming computations such as MPEG stream decoding). Programs in the compute class use the same processing resources employed for graphics class processing, as described further below.

In the graphics class, GPU 122 provides graphics and/or image processing for applications such as vertex shader programs, geometry shader programs, and pixel shader programs using parallel processing hardware, referred to herein as a "multithreaded core array" 202. GPU 122 provides image processing by way of a rendering pipeline, a shading module, and frame buffer (not shown). In one embodiment, multithreaded core array 202 provides a highly parallel architecture that supports concurrent execution of a large number of instances of programs in various combinations. Detailed descriptions of such image processing components are not included herein so as to focus on predicated launching of compute thread arrays.

In some embodiments, computations are executed by GPU 122 in one or more cooperative arrays of threads (CTA). A CTA can implement algorithms using a wide range of mathematical and logical operations, and the CTA can include conditional or branching execution paths and direct and/or indirect memory access. Threads in a CTA can share intermediate results with other threads in the same CTA, and threads of one CTA can share results with threads of another CTA in some embodiments. The size of a CTA and number of CTAs required for a particular application may depend on the application. Thus, the size of a CTA, as well as the number of CTAs to be executed, may be defined by the programmer and provided to GPU 122 as state parameters. CTAs are described in further detail in co-pending application Ser. No. 11/305,178, entitled, "Parallel Data Processing Systems and Methods Using Cooperative Thread Arrays," filed Dec. 15, 2005, incorporated by reference herein for all purposes.

As noted with respect to FIG. 1, CPU 102 issues launch commands for GPU 122 via pushbuffer 150. As described further herein, depending on state information loaded into pushbuffer 150, front end 210 of GPU 122 loads and launches threads, CTAs, or grids of CTAs until all threads have been launched.

State information, as used herein, includes any information (other than input data) relevant to defining a CTA or grid of CTAs. For example, in one embodiment, state information includes parameters that define the size of the CTA, the amount of register file space required for each thread, a starting program counter (e.g., memory address) for a program to be executed by each thread, and selection of hardware resource allocation algorithms. Parameters may be specified in the state information so that, before launching a CTA, CPU 102 provides a list of parameters to each CTA (akin to passing arguments to a function call). Each CTA can therefore receive a list of parameters, including CTA identification parameters, e.g. its CTA ID, via pushbuffer 150.

State information may also include size information for the number of threads per CTA (e.g., 256 threads per CTA) and the size of the CTA grid (a "grid" of CTAs typically includes multiple CTAs of same dimension that all execute the same program, often for an input data set that is too big for a single CTA to handle efficiently). The size of the CTA grid specifies how many CTAs are in the grid. In some embodiments, the total number (T) of threads is also provided; in other embodiments, T can be computed from the array dimensions.

Multithreaded core array 202 is configured to execute multiple threads in parallel in some embodiments. E.g., during a rendering operation, a thread might be an instance of a vertex shader program executing on attributes of a single vertex or an instance of a pixel shader program executing on a given primitive and pixel. During general-purpose computing of compute class programs, a thread can be an instance of a CTA program executing on a portion of an input data set and/or producing a portion of an output data set. In multithreaded core array 202, single-instruction, multiple-data (SIMD) instruction issue techniques support parallel execution of multiple threads by multiple processing engines without requiring multiple instruction units. In various embodiments, multiple cores within GPU 122 may support parallel execution of multiple CTAs, one core may execute more than one CTA at a time depending on the resources required per CTA, and multiple GPUs 122 within system 100 may support parallel execution of additional CTAs.

"Loading" a thread includes supplying, via front end 210 from pushbuffer 150 into GPU 122, state information, input data, and any other parameters required to execute the program. For example, in the case of CTA processing, front end 210 loads the starting PC value for the CTA program into a slot in a program counter (PC) array (not shown) that is not currently in use. Depending on state information from pushbuffer 150, front end 210 can allocate space in one or more register files (not shown) for each processing engine of GPU 122 to execute one CTA thread, and load the input data into shared memory. Once the input data for threads have been loaded, front end 210 launches the group by signaling an instruction unit in GPU 122 to begin fetching and issuing instructions.

Pushbuffer Commands for Predicated Launching of CTAs

Some applications in the compute class can be optimized by loading commands into pushbuffer 150 and then selectively launching the commands. For example, in some applications it is desirable for launching of a second program to be predicated by a result of a first program. For instance, the second program might be loaded into pushbuffer 150 to provide extra processing, but the extra processing may or may not be needed based on the results generated by a first program.

In a specific example, an iterative algorithm might load 10 CTAs in pushbuffer 150, with some certainty that the algorithm will be completed after 10 CTAs have executed, but the algorithm may provide a useful result after only 3 CTAs have completed processing. In this case, the remaining 7 CTAs that were loaded into pushbuffer 150 need not be launched.

An analogy can be made to 3D computer graphics for rendering primitives (e.g., triangles). To increase processing performance, it is possible to determine whether an object is occluded before rendering the object. For example, if one object is a hood of a car and a second object is an engine of the car, the engine can be rendered in the graphics pipeline only to an extent needed to determine whether any pixels are visible. A number of visible pixels is generated from a "report" out of the graphics pipeline. A second process reads the report, and if the number of visible pixels is zero (e.g., because the hood is closed), the second process turns off detailed rendering for the engine. Typically, the graphics pipeline still processes all of the commands from the pushbuffer to accumulate state information, but detailed rendering commands for obscured primitives are ignored, and the graphics pipeline merely accumulates state information, which runs much faster than detailed rendering. In the graphics class, there is a strong requirement to write pixels out in the order that the pixels are received, with the exception that if there is no spatial overlap between pixels, then there is no requirement to write the pixels in order.

However, in contrast to graphics class processing, heretofore there was no concept for the compute class analogous to the disabling of detailed rendering based on visibility testing of primitives. There is no concept of overlap or occlusion in compute class processing. Regardless, it is desirable in compute class processing that a first process can specify whether a second process will launch or not.

As described further below, the predicate can include one or more numeric values and/or states which may be tested against one or more predetermined values. For example in one embodiment, the predicate comprises a semaphore data structure 230 that includes a numeric value, status information, and a timestamp. The decision to execute or not execute a given instruction may be based on a comparison of the numeric value, status information, and/or timestamp with respect to the predetermined values.

Figure 3:
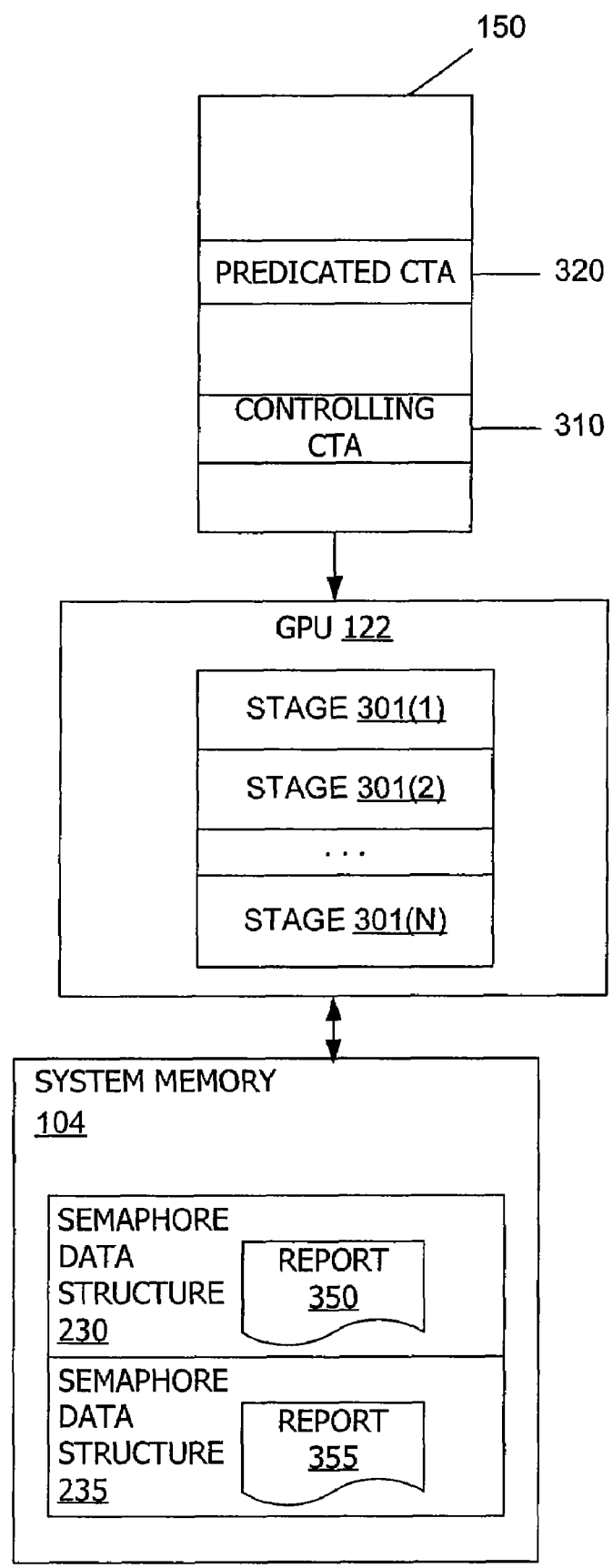
FIG. 3 illustrates a conceptual diagram of a portion of system 100, in one embodiment in accordance with the present invention.

FIG. 3 illustrates a conceptual diagram of a portion of system 100, in one embodiment in accordance with the present invention. GPU 122 includes one or more pipeline stages 301(1) to 301(N). Pipeline stages 301 may include any number N of stages in series and/or in parallel.

Within pushbuffer 150, a launch command for a controlling process (e.g., CTA) 310 is followed by a launch command for a predicated process (e.g., CTA) 320. For the sake of clarity, only a single controlling CTA 310 and a single predicated CTA 320 are depicted in pushbuffer 150, although pushbuffer 150 may include any number of controlling CTAs and predicated CTAs, in virtually any order.

One complication with predicated launching of compute class thread arrays in GPU 122 is that GPU 122 is heavily pipelined. In machines that are deeply pipelined, a branch in instruction execution can disturb the pipeline stages 301 and break the flow of instruction execution. For example, because pushbuffer 150 can be considered as a FIFO, the launch command for predicated CTA 320 can be considered as later in time than the launch command for controlling CTA 310. If controlling CTA 310 runs for a sufficiently long time in pipeline stages 301 of GPU 122, or if the launch command for predicated CTA 320 does not follow sufficiently later than the launch command for controlling CTA 310, it is possible that the launch command for predicated CTA 320 may be retrieved from pushbuffer 150 before controlling CTA 310 has completed processing. In this case, a race condition may occur because by the time the launch command for predicated CTA 320 is read from pushbuffer 150, controlling CTA 310 has not completed processing and has not issued a report 350 indicating whether predicated CTA 320 is supposed to execute. Further complicating this issue is that controlling CTA 310 needs some amount of time to write report 350 out to system memory 104 or graphics memory 124.

The predicate method described below is advantageous because rather than branching, instructions are written sequentially into pushbuffer 150 and launch commands may be executed or skipped, depending upon the predicate.

Predicated Launch with Semaphores

In general, semaphores allow two processes to negotiate access to a resource. For example, two asynchronous processes, process1 and process2 may need to synchronize writing to a buffer in memory. Once process1 has finished writing to the buffer, process1 writes a "semaphore release". Process2 may perform a "semaphore acquire" to poll whether process1 has finished writing to the buffer.

Similarly, in some embodiments, semaphore release mechanisms are used to determine whether a CTA has completed its processing, and whether to launch subsequent CTAs. In some embodiments, semaphore data structure 230 is written by controlling CTA 310 to enable/disable launching of predicated CTA 320 and/or other predicated CTAs. Semaphore data structure 230 includes a 32-bit field for report 350 in some embodiments, and may include report information such as status (e.g. memory overflow) and a timestamp (e.g., with 64-bits of resolution). However, semaphore data structure 230 can include other information and any number of bits for report 350.

Further, although only two semaphore data structures 230 and 235 are depicted in FIG. 3 for the sake of clarity, there may be a large number of semaphore data structures in system memory 104 or other memories of system 100. In some embodiments with large numbers of semaphore data structures, a particular semaphore data structure (e.g., semaphore data structure 230) may be accessed by an offset within system memory 104 (e.g., a 40-bit address that indicates a starting address for semaphore data structure 230).

FIG. 4A illustrates a sequence 410 of pushbuffer 150 commands that allow a controlling process to predicate the launch of the subsequent processes (e.g., predicated CTA 320) in an exemplary embodiment. FIG. 4B illustrates processing of the pushbuffer command sequence 410.

Note that the controlling process may be a process executing on CPU 102. Alternatively, the controlling process may be a controlling CTA generated by a process running on GPU 122. Further still, the controlling process may be a controlling shader program running on GPU 122. In this manner, a control process running on GPU 122 may determine whether a predicated process should launch on GPU 122.

The sequence 410 of pushbuffer 150 commands include the following: a semaphore acquire command 410(1), used to wait for the result of the controlling process, a launch enable command 410(2) that reads the result generated by the controlling process and either enables or disables subsequent CTA launches, and a launch command 410(3) for predicated CTA 320 that executes only if the launch enable is set (e.g., equal to True).

Processing of the exemplary sequence 410 of pushbuffer 150 commands is shown in FIG. 4B. At act 450, the controlling process (e.g., controlling CTA 310 of FIG. 3) is launched. At act 455, controlling CTA 310 executes and writes report 350 to semaphore data structure 230. At act 460, semaphore acquire command 410(1) executes to wait for the report 350 in semaphore data structure 230 written by controlling CTA 310. Typically, other work is done by the GPU 122 between act 450 and act 455.

At act 465, launch enable command 410(2) executes to read the result 350 generated by controlling CTA 310. At act 470, based on launch enable command 410(2), GPU 122 determines whether to execute launch command 410(3) for predicated CTA 320. As described further below, GPU 122 may determine whether to execute launch command 410(3) by comparing report value 350 to a predetermined value, with one or more comparison operations. For example, launch enable command 410(3) may be predicated on a result 350 that is equal to, greater than, or less than, the predetermined value.

At act 475, launch command 410(3) for predicated CTA 320 is executed for predicated CTA 320 if launching is enabled by controlling CTA 310 at act 470. Alternatively, at act 480, launch command 410(3) for predicated CTA 320 is treated as a no-op (NOP) if launching is disabled.

In some embodiments, report 350 is treated as an optional "hint". In such embodiments, act 460 is omitted and report 350 is initialized to a value that results in launching the predicated CTA. This provides the advantage of avoiding waiting and therefore avoiding wasted processing cycles. However, this may entail unnecessarily performing the predicated CTA where the act of reading report 350 occurs before report 350 has been written by the controlling CTA, and report 350 would have otherwise caused the launch to be disabled.

In some embodiments, semaphore acquire 410(1) can be replaced by a "wait for idle". The "wait for idle" simply waits for all CTA processing to be completed in GPU 122, whether the CTA processing is related to the predication or not. Since everything in GPU 122 has completed upon idle, semaphore data structure 230 and report 350 have presumably been written, and can therefore be safely read at act 465. Such embodiments provide a relatively simpler implementation since no polling is required, but may incur wasting of processing cycles in GPU 122.

Predicated Launch with Global Enable

Furthermore, in some embodiments, a "global" enable may be specified in pushbuffer 150. The global enable controls whether any subsequent CTA may launch. In some embodiments, the global enable may have the following states: True, False, Conditional, Launch If Equal, or Launch If Not Equal.

If global enable is set to True, then launching is enabled until the global enable state is set to any one of the other states. If global enable is set to False, then launching is disabled, so that a launch command for a subsequent CTA such as predicated CTA 320 will be treated in GPU 122 as a no-op (NOP).

If global enable is set to Conditional, then synchronization may be performed by waiting for an idle state in GPU 122, or with a semaphore acquire. For a semaphore acquire, GPU 122 reads the semaphore data structure (e.g., semaphore data structure 230) specified by an offset within system memory 104 (e.g., the 40-bit starting address of semaphore data structure 230). If report 350 is zero, then GPU 122 will read subsequent CTA launch commands as NOPs by setting launch enable to False. If report 350 is not zero, then GPU 122 executes subsequent CTA launch commands normally, by setting the launch enable state to True.

If global enable is set to Launch If Equal or Launch if Not Equal, then synchronization may be performed by waiting for an idle state in GPU 122, or with a semaphore acquire. For a semaphore acquire, GPU 122 reads two semaphore data structures from system memory 104 and compares a difference in report values from each semaphore data structure. For example, GPU 122 reads semaphore data structure 230 and semaphore data structure 235, where semaphore data structure 235 is located in system memory 104 immediately after semaphore data structure 230. 64-bit report values, report 350 and report 355, are read from semaphore data structures 230 and 235, respectively, and a difference is computed.

If global enable is set to Launch If Equal and if the difference is not zero, then GPU 122 treats subsequent CTA launch commands as NOP by setting the launch enable state to False. If the difference is zero, then GPU 122 will execute subsequent CTA launch commands normally, by setting the launch enable state to True.

Conversely, if global enable is set to Launch If Not Equal and if the difference is zero, then GPU 122 sets subsequent CTA launch commands to NOP, by setting the launch enable state to False. If the difference is not zero, then GPU 122 will execute subsequent CTA launch commands normally, by setting the launch enable state to True.

Example Operation of Predicated Launching

The following is an example sequence of operations that use a semaphore data structure written by a controlling CTA to enable or disable a subsequent first set of CTAs:

(A) Set LaunchEnableMode=True, to enable all CTA launches.

(B) Initialize semaphore data structure 230 with the following data:
 payload=0x0FF;
 report_value=0x00FF;
 timestamp="don't care".

(C) Launch controlling CTA which, upon completion, writes the following data to semaphore data structure 230:
 payload=0x001;
 report_value=(enable_following_CTA ? 0x001: 0x000);
 timestamp="don't care".

(D) Execute a semaphore acquire using an offset that specifies the address of semaphore data structure 230. The semaphore acquire reads the first dword of semaphore data structure 230 (i.e. the payload), looking for value 0x001. The semaphore acquire will poll the location until 0x001 is read, thereby waiting for the result from the controlling CTA.

(E) Set a launch enable offset is set to specify the address of semaphore data structure 230.

(F) Set LaunchEnableMode=Conditional, to read semaphore data structure 230. If report_value==0x000, CTA launches are disabled, else CTA launches are not disabled.

(G) Launch first set of CTAs, but only if CTA launches are enabled.

(H) Set LaunchEnableC.Mode=True, to enable launch of all other CTAs.

(I) launch subsequent non-predicated CTAs.

In some embodiments, to account for the time it takes controlling CTA 310 to complete processing, other compute work (or graphics work) may be inserted in the processing pipeline of GPU 122 between controlling CTA 310 and predicated CTA 320.

Note that controlling CTA 310 can be any process that can write semaphore data structure 230, including, for example, a 3D graphics class process running on GPU 122. For example, GPU 122 may include pushbuffer 150 commands that write semaphore reports 350 to system memory 104. Report 350 may be based on, for example, a number of pixels generated by a set of graphics primitives.

Because GPU 122 is highly parallel, with large numbers of queues, hardware at the bottom of the pipeline (e.g. back end 240 of FIG. 2) should have write queues empty before the semaphore release is written to memory. Therefore, to prevent race conditions, in some embodiments, a semaphore release may occur only after a result is written to memory. In some embodiments, hardware in GPU 122 is interlocked so that a semaphore release is performed only after queues are empty. In some embodiments, such synchronization can be done in software, since CTAs are cooperative. For example, once all CTAs are done processing, one thread can be designated to write a report to memory. Without a hardware interlock to ensure that a report will not be written to memory until all CTAs are finished processing, each thread that writes can perform a read that causes a flush out to memory. Once all threads have performed a read, then all of the threads must have finished processing, and then the designated reporting thread can write the report to memory. In still other embodiments, such synchronization is performed with a combination of hardware and software methods.

Although the invention has been described with respect to specific embodiments, it will be appreciated that the invention is intended to cover all modifications and equivalents within the scope of the following claims.

What is claimed is:

1. A method for predicated launching of cooperative thread arrays each comprising a group of threads, each thread concurrently executing a same program on different input data, the method comprising:
    loading a first launch command for a controlling cooperative thread array into a pushbuffer coupled to a graphics processor;
    launching the controlling cooperative thread array in response to execution of the first launch command;
    executing the controlling cooperative thread array to generate a report value;
    loading a launch enable command and a second launch command for a predicated cooperative thread array into the pushbuffer, wherein the launch enable command includes launch enable and launch disable functionality for the predicated cooperative thread array;
    executing the launch enable command to read the report value; and
    determining, using the launch enable command, whether to disable or enable execution of the second launch command based at least upon the report value.

2. The method of claim 1 wherein the report value generated by the controlling cooperative thread array comprises a report written to a memory coupled to the graphics processor.

3. The method of claim 1 wherein determining whether to disable or enable execution of the second launch command comprises reading a semaphore written by the first thread array to a memory coupled to the graphics processor, and comparing the semaphore to a predetermined value.

4. The method of claim 3 wherein the semaphore comprises a data structure including one or more of a payload, status information, and a timestamp.

5. The method of claim 1 wherein the graphics processor is pipelined.

6. The method of claim 1 wherein the first and second launch commands are generated by a control processor coupled to the graphics processor.

7. The method of claim 1 wherein the controlling cooperative thread array is included in a plurality of threads of a process executing on the graphics processor.

8. The method of claim 1 wherein different input data for a subset of the threads of a cooperative thread array each have a same numeric value.

9. A system for predicated launching of cooperative thread arrays each comprising a group of threads, each thread concurrently executing a same program on different input data, the system comprising:
    a central processing unit configured to generate a first launch command for a controlling cooperative thread array and a launch enable command and a second launch command for a predicated cooperative thread array;
    a memory coupled to the central processing unit, the memory including a pushbuffer configured to receive the first launch command, the launch enable command, and the second launch command from the central processing unit, wherein the launch enable command includes launch enable and launch disable functionality for the predicated cooperative thread array; and
    a graphics processor coupled to the memory, the graphics processor configured to;
    launch the controlling cooperative thread array in response to execution of the first launch command;
    execute the controlling cooperative thread array to generate a report value;
    determine, using the launch enable command, whether to disable or enable execution of the second launch command based at least upon the report value.

10. The system of claim 9 wherein the report value generated by the controlling cooperative thread array comprises a report written to the memory.

11. The system of claim 9 wherein the graphics processor is configured to determine whether to disable or enable execution of the second launch command by reading a semaphore written by the first thread array to the memory and comparing the semaphore to a predetermined value.

12. The system of claim 11 wherein the semaphore comprises a data structure including one or more of a payload, status information, and a timestamp.

13. The system of claim 9 wherein the graphics processor is pipelined.

14. The system of claim 9 wherein the controlling cooperative thread array is included in a plurality of threads of an iterative algorithm executing on the central processing unit or the graphics processor.

15. A system for predicated launching of cooperative thread arrays each comprising a group of threads, each thread concurrently executing a same program on different input data, the system comprising:

a graphics processor configured to generate a first launch command for a controlling cooperative thread array and a launch enable command and a second launch command for a predicated cooperative thread array;

a memory coupled to the graphics processor, the memory including a pushbuffer configured to receive the first launch command, the launch enable command, and the second launch command, wherein the launch enable command includes launch enable and launch disable functionality for the predicated cooperative thread array;

wherein the graphics processor is further configured to:

launch the controlling cooperative thread array in response to execution of the first launch command;

execute the controlling cooperative thread array to generate a report value;

determine, using the launch enable command, whether to disable or enable execution of the second launch command based at least upon the report value.

16. The system of claim 15 wherein the report value generated by the controlling cooperative thread array comprises a report written to a memory coupled to the graphics processor.

17. The system of claim 15 wherein the central processing unit is configured to determine whether to disable or enable execution of the second launch command by reading a semaphore written by the controlling cooperative thread array to the memory coupled to the graphics processor and comparing the semaphore to a predetermined value.

18. The system of claim 17 wherein the semaphore comprises a data structure including one or more of a payload, status information, and a timestamp.

* * * * *